United States Patent [19]

Hansen

[11] Patent Number: 4,858,740
[45] Date of Patent: Aug. 22, 1989

[54] OVERLOAD RELEASE CLUTCH

[76] Inventor: Quinten A. Hansen, P.O. Box 882, Racine, Wis. 53403

[21] Appl. No.: 166,476

[22] Filed: Mar. 10, 1988

[51] Int. Cl.⁴ .......................... F16D 7/00; F16D 43/20
[52] U.S. Cl. .................................................. 192/56 R
[58] Field of Search ...................................... 192/56 R

[56] References Cited

U.S. PATENT DOCUMENTS

| | | | |
|---|---|---|---|
| 2,775,327 | 12/1956 | Gearhart | 192/56 R |
| 3,835,973 | 9/1974 | Braggins et al. | 192/56 R |
| 4,220,230 | 9/1980 | Hansen | 64/29 X |
| 4,255,946 | 3/1981 | Hansen | 192/56 R |
| 4,538,715 | 9/1985 | Konrad et al. | 192/56 R |
| 4,770,281 | 9/1988 | Hanks | 192/56 R |

Primary Examiner—Leslie A. Braun
Assistant Examiner—Andrea Pitts
Attorney, Agent, or Firm—Arthur J. Hansmann

[57] ABSTRACT

Overload release clutch with input and output rotational members and with several springs forcing an interconnecting member into limited torsional connection between the rotational members. A torsion release arrangement for the interconnecting member whereby more than a point contact exists for applying the release force, and with a restrainer for selectively holding the rotational member in non-driving relation upon release action.

1 Claim, 1 Drawing Sheet

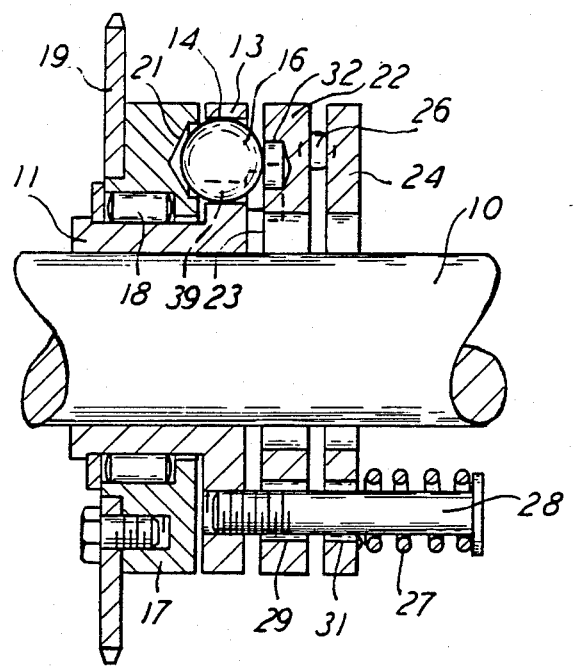
FIG. 1
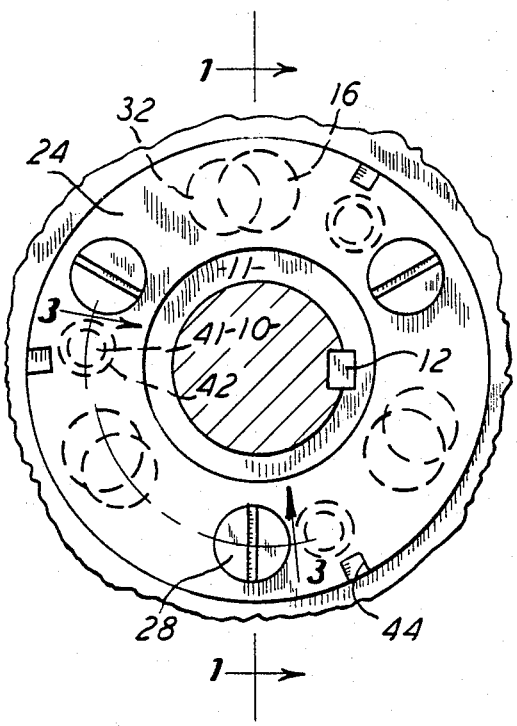
FIG. 2
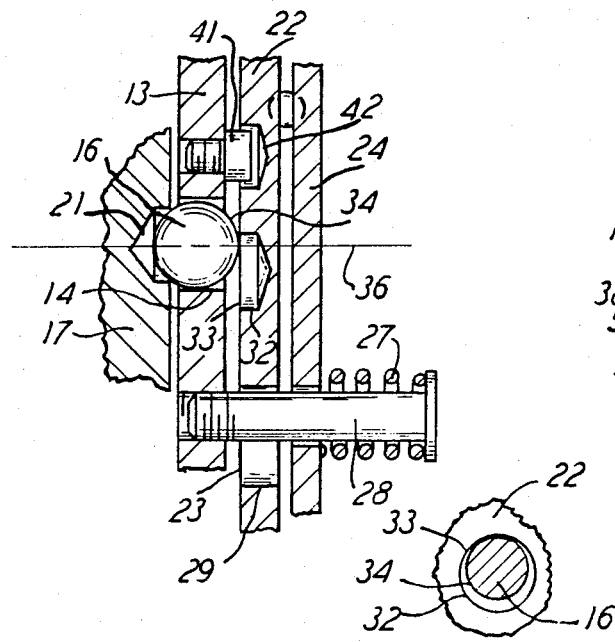
FIG. 3
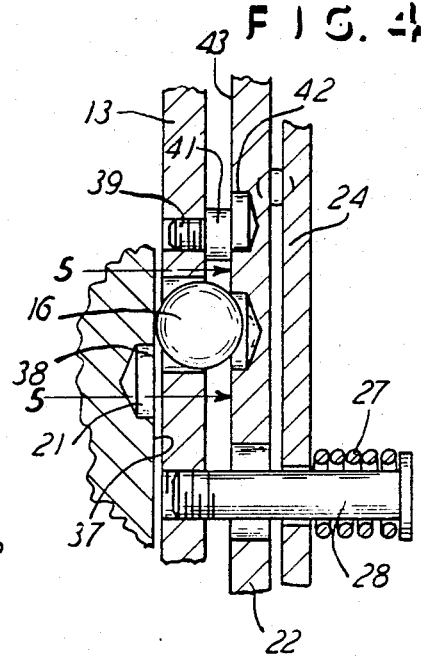
FIG. 4
FIG. 5

OVERLOAD RELEASE CLUTCH

This invention releates to an overload release clutch, and, more particularly, it relates to a release clutch which is capable of withstanding wear characteristics which commonly exist in clutches which release under overload forces.

BACKGROUND OF THE INVENTION

The present invention improves upon the overload release clutch of the type shown in U.S. Pat. Nos. 3,835,973 and 4,220,230, the latter one being my own previous invention. The present invention differs from the prior art in that it is a release clutch which avoids wear commonly induced by the forces which operate to cause the clutch to release. The clutch shown in U.S. Pat. No. 3,835,973 shows and describes only limited relative rotation of the clutch-engaging members which are not disclosed as rotating past each other in either direction of rotation. Further, the engaging members are two separate and relatively radially movable parts which must be provided for in a plurality of parts, rather than only several of one type of a movable part as in the present invention.

Further, the prior art, as in my previous patent U.S. Pat. No. 4,220,230, differs from the present invention in that it requires certain sizing and dimensioning between the respective diameters of a ball and a pin, and they present a point contact between each other, and thus the release torque in that clutch is of a concentrated pressure requiring sturdy parts which normally must be hardened to sustain the wear.

Accordingly, the present invention improves upon the prior art in that it provides for an overload release clutch which withstands release forces, and, upon release the input and output members can be rotated in both directions of rotation, relative to each other, and the release torque can be adjustably set in the clutch and there is only a minimal amount of wear and stress on the clutch parts themselves. That is, where the prior art provides for a point contact in the clutch elements, the present invention provides for a line contact with only one part thereof being a movable part and with that same part being the one which disengages the clutch. Another part then provides for retaining the clutch in the disengaged position until the clutch is re-set to again subject itself to the overload or desired torque condition. As such, the present invention does not require the strength nor hardening of parts, as in the prior art, and the clutch in the present invention is more reliable, sturdy, and durable on its nature as an overload release clutch.

BRIEF DESCRIPTION OF THE DRAWINGS

FIG. 1 is a sectional view of a clutch showing a preferred embodiment of this invention, and with the section being taken along the line 1—1 of FIG. 2.

FIG. 2 is an end elevational view of FIG. 1.

FIG. 3 is a sectional view taken substantially along the arcuate line 3—3 of FIG. 2, and showing the clutch in the engaged position.

FIG. 4 is a sectional view similar to FIG. 3, but showing the clutch in the disengaged position.

FIG. 5 is a sectional view taken along the line 5—5 of FIG. 4, at the arrow heads thereof.

DETAILED DESCRIPTION OF THE PREFERRED EMBODIMENT

The clutch is shown mounted on a shaft 10, and it has a cylindrical body 11 keyed to the shaft 10 by means of a key 12. The body 11 has a circular flange 13 which has several cylindrical openings 14 extending therethrough for movable reception and support of an equal number of balls 16, such as three which are indicated in FIG. 2.

Thus the shaft 10, body 11, along with the several balls 16, all rotate in either direction of rotation as one unit, and may be either the input or the output member of this bi-directional clutch.

A cylindrical shaped clutch rotor member 17 is also co-axial with the shaft 10 and is shown to be rotatably mounted on the rotor 11 by means of roller bearings 18. The member 17 is shown to have a sprocket 19 secured thereto for rotation therewith. Thus, the rotor 17 may be either the input or output rotational member of this clutch, and the member 17 is rotatable relative to the member 11, except of course when the clutch is engaged by means of the balls 16, as described hereinafter.

The rotor 17 has several detents or pockets 21 which are substantially the diameter of the balls 16 and which receive a portion of the balls 16 when the clutch is in the engaged position, as shown in FIGS. 1 and 3. As such, the members 11 and 17 rotate in unison in that clutch engaged position.

To hold the balls 16 in the clutch engaged position, a circular pressure plate 22 is co-axial with the shaft 10 and has a face 23 which bears against the balls 16 for holding the balls 16 into the detents 21 in the clutch engaged position. A circular spring plate 24 is also concentric with the shaft 10 and is adjacent the pressure plate 22 for urging the pressure plate 22 against the balls 16, for instance through the intervention of several balls 26 interposed between the plates 22 and 24.

Finally, several springs, such as the spring 27, are piloted on screws 28 for pressing against the spring plate 24 and thereby press on the balls 16, as mentioned. The screws 28 of course embed in the flange 13 and are adjustable therein for adjusting the amount of pressure from the spring 27 on the balls 16 and thereby permitting adjustment of the overload torque which can be transmitted through the clutch. The screws 28 freely pass through enlarged openings 29 and 31 in the plates 22 and 24, respectively. Also, the opening 29 is elongated, and thus the plate 22 can rotate slightly and relative to the plate 24, all for the purpose of engagement and disengagement of the clutch, as hereinafter described. In that arrangement, the balls 26 are in grooves in the plates 22 and 24 to permit the relative rotation, such as in the arrangement shown in my U.S. Pat. No. 4,220,230 with respect to the balls 37 and the slots 38 and 39 shown in said patent.

For the release action of this bi-directional clutch, the pressure plate 22 has a detent or opening 32 for each of the balls 16, and the opening 32 is shown to be slightly offset from the axial location of the respective detent 21, as shown in FIGS. 2 and 3 in the clutch engaged position. Therefore, each ball 16 nests with its respective detent 32, even in the engaged position, and there is a length of the detent edge 33 which is in contact with the surface 34 of the ball 16. That is, the curvature of the edge 33 and the curvature forming the exterior surface of the sphere 34 are in the same direction and are thus complimentary, rather than providing an opposite direction of curvature which presents only a point contact therebetween with the resultant high pressure upon transmission of torque and particularly upon disengagement of those two surfaces in the disengaging action of the clutch. Accordingly, the clutch is sturdy, in this regard and in these respects, and the parts do not suffer self-destructing damage.

Accordingly, FIG. 3 shows the center line 36 through the axis of the ball 16 intersects the circular opening 33, and therefore the ball 16 is slightly disposed into the detent 32, to provide for the slight line contact between the ball 16 and the edge 33, as described. Also see the line contact in FIG. 5.

Upon the overload limit of the clutch, the springs 27 will be overcome by means of the torsional force between the members 11 and 17, and with that force of course being applied to the ball 16. In turn, that force on the ball 16 will create an axial force on the pressure plate 22 since the balls 16 will force their way into the pressure plate detents 32, to the position shown in FIG. 4. In that position, the balls 16 are then in contact with the surface 37 of the rotor 17, and the balls are freed of the rotor detents 21, and thus the two rotational members of the clutch are free to rotate relative to each other in that clutch disengaged position as shown in FIG. 4. Again, to achieve that disengagement, the two detents 21 and 32 are circular and each has the circular edge, such as the edge 33 of the detent 32 and the edge 38 of the detent 21. That arrangement of circular edges provides for the greatest amount of surface contact between the spheres or balls 16 and the respective detents 21 and 32, so that the achievement of minimum wear and tear is obtained, and the hardening of parts is less critical than in my previous invention.

To maintain the clutch in the released position shown in FIG. 4, a pin 39 is shown embedded in the body 13 adjacent each ball 16, but clear thereof and spaced therefrom. Each pin 39 has a head 41 which is received in an opening 42 in the pressure plate 22, in the clutch engaged position of FIG. 3. In the disengaged position, the head 41 is moved out of the opening 42 and abuts the transverse surface 43 on the pressure plate 22. Thus, the head 41 holds the plate 22 against the pressure of the springs 27 and thus retains the clutch in the disengaged position of FIG. 4 until the body 11 and pressure plate 22 are brought back into the engaged position shown in FIG. 3. That re-positioning is achieved by means of placing a screwdriver or the like in complimentary slots 44 in the plates 22 and 24 to achieve the clutch engagement alignment mentioned, and to do so in accordance with the disclosure in my U.S. Pat. No. 4,220,230. In that regard, it will be recalled that the slot 29 in the plate 22 was described as elongated, and thus it permits the relative rotation shown between the engaged and disengaged positions. In further respects, the disclosure of U.S. Pat. No. 4,220,230 is incorporated herein for a basic description of that type of clutch.

In the present invention, there is no contact between the balls 16 and the pins 39, and therefore the only surface hardening required is with respect to surface 43 of the pressure plate 22. Further, the head 41 of the pin 39 can be much larger than the head of the pin in my previous patent which presented a point contact between the head of the pin and the adjacent sphere or ball.

The clutch is therefore arranged so that either member 11 or 17 can be the rotational input member, and the clutch can also be readily constructed for rotation of the release action in either direction. The balls 16 serve as rotational inter-connecting members disposed between these input and output members, and the action of all movable parts is axial with respect to the shaft 10. The several springs 27 provide the force-applying means for clutch engagement, and the several pins 39 provide the resistance members for overcoming the springs in the disengaged position and thereby positively retained the disengaged position. In all respects, the torque transmitting balls 16 and the disengaged pins 39 are spaced from each other and do not contact each other and therefore do not wear and tear upon each other, and thus this clutch is an improvement over the prior art.

By simply locating the detent 32 on the other side of the ball axis 36 and by re-locating the enlarged opening 29, the clutch can be made to operate in the opposite direction. That is, the pins 39 can move in either direction.

I claim:

1. In an overload release clutch having a body rotatable about an axis and having a series of circumferentially spaced holes extending in an axial direction, a rotor rotatably mounted about said axis and adjacent said body and having a plurality of detents, one detent for each of said holes in said body, said detents being circumferentially alignable on a common axis with the holes in said body when said clutch is engaged, a ball in each of said holes and engagable in said detents in clutch engaged position and forming torque transmitting means between said body and rotor, a spring plate, mounting means for shiftably mounting said spring plate to said body, spring means acting between said mounting means and said spring plate for resiliently urging said spring plate towards said body, a pressure plate shiftably mounted on said mounting means, one of said body and said pressure plate having a transverse surface said pressure plate extending between said transverse surface and said spring plate, pins extending between said body and said pressure plate, said spring means bearing against said spring plate and acting to urge said pressure plate against said torque transmitting balls for causing clutch engagement, whereby when excessive torque loads are imposed upon said clutch said rotor and body rotate relative to one another thereby causing axial movement of said balls from said detents and consequent clutch disengagement, said transverse surface having pin holes extending therethrough for receiving portions of said pins, and with said pin holes and said pins being spaced from said body holes and said balls, said axial movement of said balls causing axial movement of said pins out from their respective said pin holes and causing said pins to bear against said transverse surface, thereby permitting said pressure plate to rotate slightly relative to said body to cause disengagement of said clutch, the improvement comprising said transverse surface is on said pressure plate and has circular openings disposed around said pressure plate with said circular openings disposed axially offset from said common axis of said detents and said body holes and with the circular edge which defines each of said circular openings to the side of said openings which is in the direction of rotation of said pressure plate during clutch release being in contact with said balls when said clutch is engaged, said circular openings being located and arranged to receive portions of said balls upon clutch disengagement.

* * * * *